Jan. 19, 1954                E. J. POIRIER                2,666,840
                          HEATED VEHICLE COVER
Filed June 8, 1951                                    2 Sheets-Sheet 1
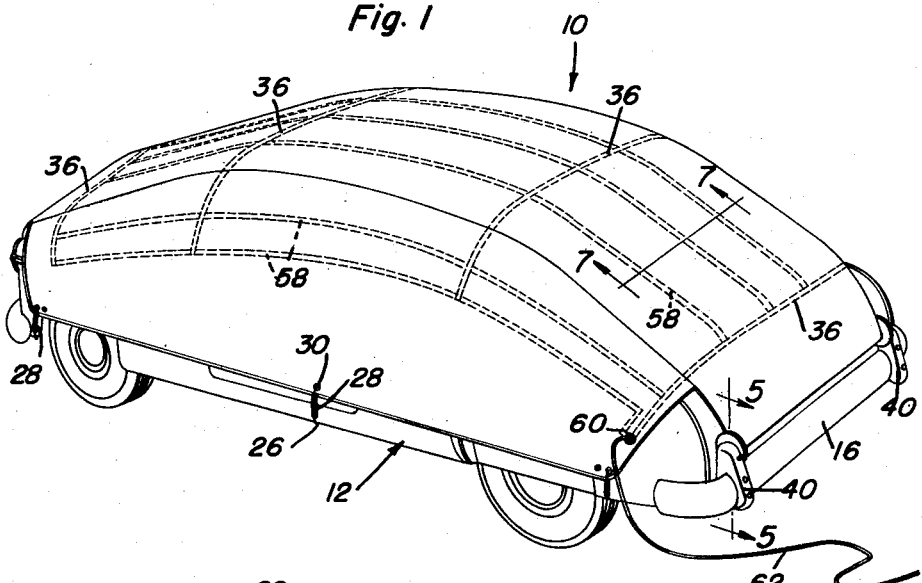
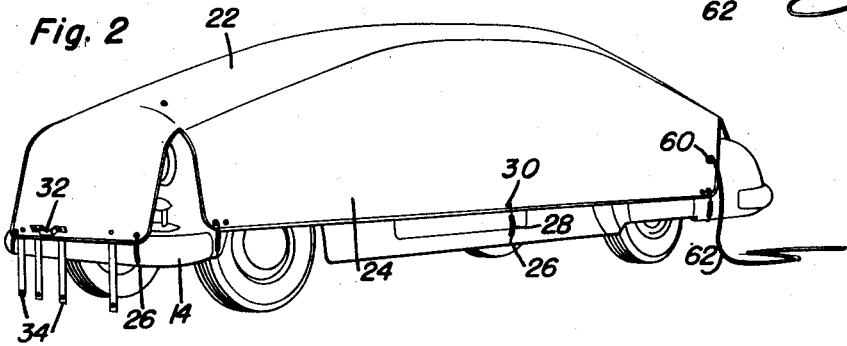
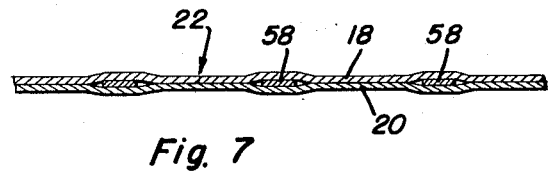
Ernest J. Poirier
         INVENTOR.
BY
                    Attorneys Jan. 19, 1954    E. J. POIRIER    2,666,840
HEATED VEHICLE COVER Filed June 8, 1951    2 Sheets-Sheet 2

Ernest J. Poirier, INVENTOR.

BY *Clarence A. O'Brien*
*and Harvey B. Jacobson*
Attorneys

Patented Jan. 19, 1954

2,666,840

UNITED STATES PATENT OFFICE 2,666,840

HEATED VEHICLE COVER

Ernest J. Poirier, Alhambra, Calif., assignor of ten per cent to John I. Hill, Alhambra, Calif.

Application June 8, 1951, Serial No. 230,453

4 Claims. (Cl. 219—46)

1

This invention comprises novel and useful improvements in a vehicle cover and more specifically pertains to a pliable sheet adapted to enclose, protect and heat an automotive vehicle, and which may be stored in a compact space when not in use.

The primary object of this invention is to provide a protective covering for automotive vehicles and the like which will substantially completely enclose an automobile for protecting the same against the weather and for heating the automobile as desired.

A further object of the invention is to provide a protective covering in conformity with the foregoing object which shall be of a particularly lightweight and readily portable construction.

A still further object of the invention is to provide a vehicle cover as set forth hereinbefore which is adapted to be stored upon a springwound reel in order to render the same readily portable, and may be easily attached to or removed from mounting brackets upon the rear bumper of an automobile; may be readily stretched across the top and sides of an automobile and anchored thereto.

Yet another object of the invention is to provide an automobile protective covering in accordance with the preceding objects which shall have embedded therein flexible reinforcing stays to cause the cover to more snugly encase and conform to the contour of the automobile; together with electrical resistance heating elements embedded in the material of the covering whereby the automobile within the cover may be warmed by any suitable electrical heating means.

These, together with various ancillary features and objects of the invention, which will later become apparent as the following description proceeds, are attained by the present invention, a preferred embodiment of which has been illustrated, by way of example only, in the accompanying drawings, wherein:

Figure 1 is a perspective view showing an automobile having applied thereto the protective covering in accordance with this invention;

Figure 2 is a perspective view of the arrangement of Figure 1 but taken at a slightly different angle to show more clearly the front portion of the covering and its attachment to the front bumper of the vehicle;

2

Figure 4:
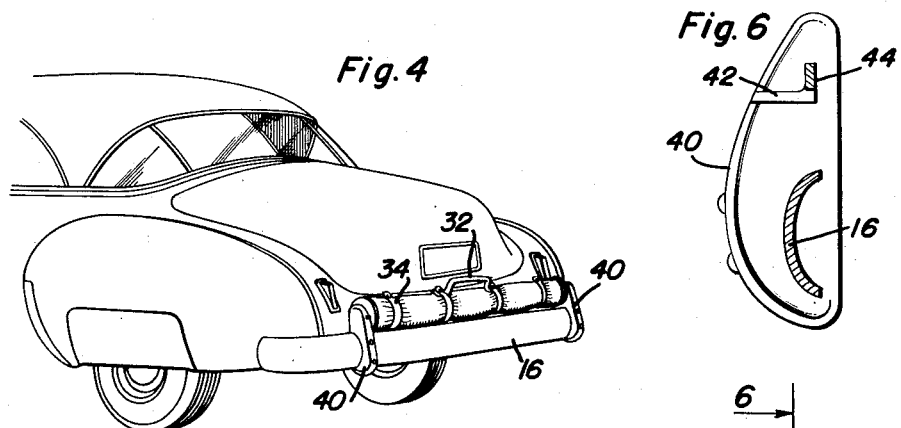
Figure 6:
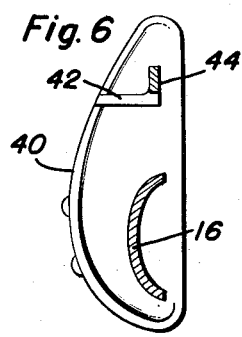
Figure 5:
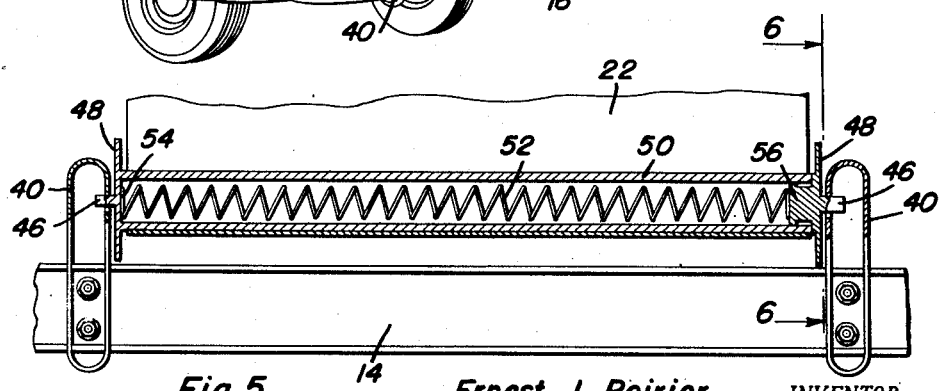

Figure 4 is a perspective view of the rear of the automobile showing the covering completely rolled upon the reel and secured thereto for storage or for removal of the reel from its supporting brackets upon the rear bumper;

Figure 5 is a vertical transverse sectional view taken substantially upon the plane indicated by the section line 5—5 of Figure 1 and showing the manner in which the spring wound reel is constructed and mounted upon the supporting brackets; and Figure 6 is a vertical longitudinal sectional detail view taken substantially upon the plane indicated by the section line 6—6 of Figure 5; and Figure 7 is a vertical transverse sectional detail view taken substantially upon the plane indicated by the section line 7—7 of Figure 1 and illustrating the manner in which the electrical resistor elements are embedded in the material of the covering.

Figure 3:
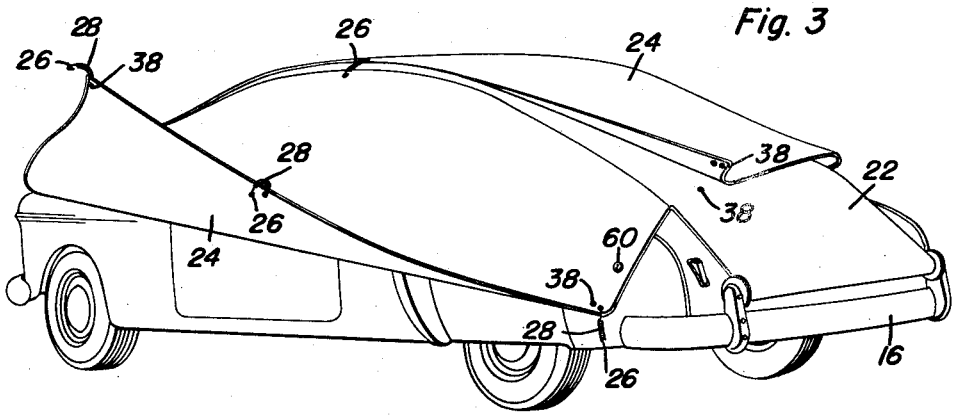
Figure 3 is a perspective view similar to Figure 1 but showing the side panels of the covering unfastened from the vehicle and indicating the manner in which these panels are folded upon the central strip of the covering as a prelude to rolling the cover for storage.

Referring now more specifically to the accompanying drawings, wherein like numerals designate similar parts throughout the various views, it will be seen that the numeral 10 designates generally the novel cover assembly in accordance with this invention, which, as shown in Figures 1–3, is applied in operative covering position to an automotive vehicle, indicated generally by the numeral 12, and which includes the usual front and rear bumpers 14 and 16.

The covering may be of any suitable material of a lightweight, pliable nature, as, for example, sheets of plastic, waterproof fabric, and the like, it being particularly intended that the invention shall include attractively colored plastic materials which may conform to and artistically harmonize with the finish of the vehicle 12.

Illustrated in these drawings, as particularly shown in Figure 7, is a construction wherein the pliable material consists of a pair of coextensive sheets, such as those shown at 18 and 20, which are superimposed upon and secured to each other to form a unitary sheet for a purpose which will later be set forth.

The covering comprises a central strip 22 which is long enough to extend from the rear bumper to the front bumper as shown in the drawings and cover the top surface of the vehicle from the front to the rear. A pair of side panels 24 are sewed or otherwise fixedly secured at one edge to an edge of the central strip 22 intermediate the ends of the latter, the side panels being of sufficient size to extend down to about the position of the bumpers and thus encase the major portion of the sides of the vehicle. The front and rear ends of these side panels in the interest of the economical construction may terminate short of the front panels, as shown in Figures 1 and 2, and preferably extend from adjacent the front bumper to just forwardly of the rear bumper. It will be appreciated that in some instances these side panels may be extended to actually overlap or connect with the front and rear ends of the central panel, as, for example, by ties or snap fasteners, where it is considered necessary to completely encase the sides of the vehicle, although this construction will obviously be of a somewhat more expensive nature than that illustrated.

The front edge of the central strip 22 and the lower edges of the side panels 24 are provided with an appropriate number of fasteners consisting of hooks 26 which are adapted to engage under the lower edge of the front bumper, and under the sides of the vehicle, as illustrated, these hooks being secured to the edges of the central strip and side panels by resilient members 28 which may consist of springs, strips of elastic material and the like secured to suitable eyelets 30 in the material of the cover. These fastening means thus will retain the edges of the cover in a tensioned position upon the top and sides of the vehicle to cause the cover to smoothly conform to the outer surface of the vehicle.

As will be more clearly apparent from Figure 2, the front end of the central strip is further provided with a strap or other member 32 constituting a handle or grip member whereby the central strip may be pulled across the top of the vehicle; and may serve as a handle for the cover in its rolled or stored position, as set forth hereinafter.

The front end of the central strip is further provided with a plurality of straps 34, whose purpose will be later set forth.

As suggested by dotted lines in Figure 1, there are provided a plurality of flexible stays 36 of aluminum or other suitable material which are embedded between the two sheets 18 and 20 forming the cover and in the central strip 22 thereof, these members extending transversely of the cover for reinforcing the same and for causing the cover to have sufficient stiffness to enable the same to be drawn out tightly without wrinkles over the top surface and sides of the vehicle.

As suggested in Figure 3, suitable snap fasteners 38 are secured to appropriate portions of the central strip and the side panels to enable the side panels to be folded upon the central strip and upon each other and be secured in position to enable the central strip and side panel members to form a single web which may be easily rolled up for storage or unrolled for installation upon the vehicle.

It is evident that various means could be provided for detachably securing the rear end of the central strip to the rear bumper of the vehicle. It is preferred, however, to perform a means which is not only compact, but will resiliently tension the rear end of the central strip and also will constitute a convenient carrying means for transporting the cover when not in use.

Referring now more particularly to Figures 4–6, it will be seen that a pair of bracket members 40 are mounted upon the rear bumper 16, these bracket members being upstanding from the bumper, as shown in Figures 3 and 4, and having their adjacent vertical surfaces provided with inwardly extending horizontal slots 42 whose backward ends are provided with a vertically disposed upwardly extending slot 44.

These slots, as suggested in Figures 5 and 6, are adapted to detachably receive and securely retain the axially extending pintles carried by the end disks 48 of a cylindrical or tubular spool or reel 50. Disposed within the tubular reel is a torsion spring 52 having one extremity 54 anchored to one of the end disks 48 which is preferably formed integral with the tubular member 50. The other end of the torsion spring is secured to a tensioning plug 56 integral with one of the pintles 46, and rotatably received within the end of the tubular reel 50. This reel is of a conventional and known construction, and differs from such construction merely in the size and material of its parts for adapting the same to accommodate itself to the use intended.

It will now be apparent that with the torsion spring 50 suitably tensioned by rotation of the tensioning member 56, and the rear end of the central strip 22 being secured in any desired manner to the reel, that the reel will yieldingly tend to roll up this strip thereon into the form of a compact bundle as shown in Figure 4. When the cover is thus rolled up, the above mentioned straps 34 may be secured about the bundle and snapped together to provide a compact bundle which may be readily carried by the handle 32 previously mentioned, and as will be readily apparent from Figure 4.

When it is desired to use the cover, the rolled cover can be removed from its place of storage, as in the trunk compartment of a vehicle or the like, and quickly inserted in the supporting brackets 40. The fastening straps 34 will then be released, and by means of the handle 32 the cover will be pulled over the top of the vehicle from the rear to the front thereof and the fasteners of the front end will be hooked to the front bumper. The side panels will then be unsnapped from their folded position and folded downwardly upon the sides of the vehicle and their hook members engaged below the lower edges of the sides, whereupon the cover is in proper position for use.

It will be apparent that as so far described, a weather-proof cover has been provided which will be effective for the purposes intended. However, in many instances an electrically heated cover will be found useful. For that purpose, a plurality of electrical resistance heaters in the form of strips 58, see Figure 7 and Figure 1, are embedded in the material of the central strip and extend longitudinally thereof, as shown in Figure 7. In some instances, as shown in Figure 1, these strips may also be extended through the upper portion of the side panels. The plurality of resistance heaters are provided with a common electrical contact 60, preferably disposed in one of the side panels, by means of which electric currents from any suitable source may be supplied to the electrical resistance heaters, as by a conducting cable 62. It is contemplated that this current may be supplied from any suitable lighting source; a heavy-duty storage battery, or even, in some instances, by the battery of the vehicle.

When the cover is thus applied, the vehicle will not only be protected from the weather, as above set forth, but also may be heated to warm the interior thereof.

Since, from the foregoing, the construction and advantage of this vehicle cover are readily apparent, further description is believed to be unnecessary.

However, since numerous modifications and equivalents will readily occur to those skilled in the art after a consideration of the foregoing specification and accompanying drawings, it is not intended to limit the invention to the exact embodiment shown and described, but all suitable modifications and equivalents may be resorted to which fall within the scope of the appended claims.

Having described the invention, what is claimed as new is:

1. A vehicle cover comprising a sheet of pliable material having a longitudinal central strip adapted to cover a vehicle top surface from its rear to its front bumper and including side panels having one edge of each secured to an edge of the central strip intermediate its ends, transverse flexible stays embedded in the central strip and extending across substantially the entire width thereof, means for securing the central strip to the front and rear bumpers, resiliently adjustable means securing the side panels to the sides of a vehicle at spaced points therealong, electrical resistance heaters embedded in said cover, means for supplying current to said heaters.

2. A vehicle cover comprising a sheet of pliable material having a longitudinal central strip adapted to cover a vehicle top surface from its rear to its front bumper and including side panels having one edge of each secured to an edge of the central strip intermediate its ends, transverse flexible stays embedded in the central strip and extending across substantially the entire width thereof, means for securing the central strip to the front and rear bumpers, resiliently adjustable means securing the side panels to the sides of a vehicle at spaced points therealong, electrical resistance heaters embedded in said cover, means for supplying current to said heaters, said resistance heaters being disposed in the edge portions of the side panels adjacent the central strip.

3. A vehicle cover comprising a sheet of pliable material having a longitudinal central strip adapted to cover a vehicle top surface from its rear to its front bumper and including side panels having one edge of each secured to an edge of the central strip intermediate its ends, transverse flexible stays embedded in the central strip and extending across substantially the entire width thereof, means for securing the central strip to the front and rear bumpers, resiliently adjustable means securing the side panels to the sides of a vehicle at spaced points therealong, electrical resistance heaters embedded in said cover, means for supplying current to said heaters, said central strip and said side panels each consisting of a pair of sheets secured together, said stays and resistance heaters being secured between said sheets.

4. A vehicle cover comprising a sheet of pliable material having a longitudinal central strip adapted to cover a vehicle top surface from its rear to its front bumper and including side panels having one edge of each secured to an edge of the central strip intermediate its ends, transverse flexible stays embedded in the central strip and extending across substantially the entire width thereof, means for securing the central strip to the front and rear bumpers, resiliently adjustable means securing the side panels to the sides of a vehicle at spaced points therealong, electrical resistance heaters embedded in said cover, means for supplying current to said heaters, said central strip and said side panels each consisting of a pair of sheets secured together, said stays and resistance heaters being secured between said sheets, including snap fasteners for securing the outer ends of said side panels in folded position upon said central strip.

ERNEST J. POIRIER.

References Cited in the file of this patent

UNITED STATES PATENTS

| Number | Name | Date |
|---|---|---|
| 1,361,533 | Newell | Dec. 17, 1920 |
| 1,719,055 | Herzer | July 2, 1929 |
| 1,833,761 | Stranszky | Nov. 24, 1931 |
| 1,912,231 | Wandscheer | May 30, 1933 |
| 1,918,423 | Persinger | July 18, 1933 |
| 2,113,294 | Dotten | Apr. 5, 1938 |
| 2,201,984 | Clark | May 28, 1940 |
| 2,231,293 | Norman | Feb. 11, 1941 |
| 2,248,655 | Bilia | July 8, 1941 |
| 2,404,736 | Marick | July 23, 1946 |
| 2,442,132 | Laythe | May 25, 1948 |
| 2,496,085 | Engelheart | Jan. 31, 1950 |
| 2,598,940 | Robie | June 3, 1952 |